(12) United States Patent
Johns et al.

(10) Patent No.: US 9,148,697 B2
(45) Date of Patent: Sep. 29, 2015

(54) SYSTEM AND CIRCUIT FOR TELEVISION POWER STATE CONTROL

(75) Inventors: Jeff Johns, Murphy, TX (US); Bill Fang, Plano, TX (US)

(73) Assignee: Enseo, Inc., Richardson, TX (US)

( * ) Notice: Subject to any disclaimer, the term of this patent is extended or adjusted under 35 U.S.C. 154(b) by 0 days.

(21) Appl. No.: 13/171,190

(22) Filed: Jun. 28, 2011

(65) Prior Publication Data

US 2011/0317078 A1   Dec. 29, 2011

Related U.S. Application Data

(60) Provisional application No. 61/359,251, filed on Jun. 28, 2010.

(51) Int. Cl.
*H04N 5/63* (2006.01)
*H04N 21/443* (2011.01)

(52) U.S. Cl.
CPC ............. *H04N 21/4432* (2013.01); *H04N 5/63* (2013.01)

(58) Field of Classification Search
CPC ............................. H04N 21/4432; H04N 5/63
USPC .......................................................... 348/730
See application file for complete search history.

(56) References Cited

U.S. PATENT DOCUMENTS

| | | | | |
|---|---|---|---|---|
| 3,811,090 A | * | 5/1974 | Uchida et al. ................. | 348/730 |
| 4,331,977 A | * | 5/1982 | Cohn et al. ..................... | 348/725 |
| 4,439,784 A | * | 3/1984 | Furukawa et al. .............. | 725/25 |
| 4,951,309 A | | 8/1990 | Gross et al. | |
| 5,519,506 A | | 5/1996 | D'Avello et al. | |
| 6,002,380 A | * | 12/1999 | Lee ................................ | 345/13 |
| 6,076,169 A | * | 6/2000 | Lee ................................ | 713/320 |
| 6,205,318 B1 | * | 3/2001 | Schindler et al. ............ | 455/3.06 |
| 6,259,486 B1 | * | 7/2001 | Mahvi ........................... | 348/553 |
| 6,407,840 B1 | | 6/2002 | Shien-Te et al. | |
| 7,411,631 B1 | * | 8/2008 | Joshi et al. ..................... | 348/734 |
| 7,730,507 B2 | * | 6/2010 | Sakai et al. ..................... | 725/14 |
| 2005/0132420 A1 | * | 6/2005 | Howard et al. ............... | 725/135 |
| 2005/0243081 A1 | * | 11/2005 | Cha et al. ...................... | 345/212 |
| 2006/0140452 A1 | * | 6/2006 | Raynor et al. ................ | 382/115 |
| 2007/0152994 A1 | * | 7/2007 | Koh ................................ | 345/211 |
| 2008/0270814 A1 | | 10/2008 | Starr et al. | |
| 2009/0010671 A1 | * | 1/2009 | Hashimoto ..................... | 399/88 |
| 2009/0021649 A1 | * | 1/2009 | Lee et al. ..................... | 348/730 |
| 2009/0316796 A1 | * | 12/2009 | Taleb et al. ............. | 375/240.25 |
| 2010/0196038 A1 | * | 8/2010 | Yamaguchi et al. ........... | 399/69 |
| 2010/0306558 A1 | * | 12/2010 | Kang ............................. | 713/300 |
| 2011/0179300 A1 | * | 7/2011 | Suzuki et al. ................. | 713/323 |

* cited by examiner

*Primary Examiner* — Nasser Goodarzi
*Assistant Examiner* — Michael B Pierorazio
(74) *Attorney, Agent, or Firm* — Scott T. Griggs; Griggs Bergen LLP

(57) ABSTRACT

A system and circuit for television power state control are disclosed. In one embodiment, a power management circuit is coupled to a television and interposed between a video feed and an image display engine as well as between an audio feed and a speaker. The power management circuit selectively alternates the television between three states: powered on/operating state (first state); power standby state (second state); and no/low power state (third state). Utilized with a television in a commercial application, the system and circuit are employed to provide accelerated turn-on time to receive an image for user interaction, while providing sufficient control to maintain energy power savings.

18 Claims, 2 Drawing Sheets

SYSTEM AND CIRCUIT FOR TELEVISION POWER STATE CONTROL

PRIORITY STATEMENT & CROSS-REFERENCE TO STATE CONTROL

This application claims priority from co-pending U.S. Patent Application No. 61/359,251, entitled "System and Method for Television Power State Control" and filed on Jun. 28, 2010, in the names of Johns et al.; which is hereby incorporated by reference for all purposes.

TECHNICAL FIELD OF THE INVENTION

This invention relates, in general, to the control of the power state of a television and, in particular, to a system and circuit for facilitating acceleration from no power/low power states to powered ON/operating states.

BACKGROUND OF THE INVENTION

Without limiting the scope of the present invention, its background will be described with reference to power state control in commercial applications, such as hotels. When placing a television in a commercial environment for independent operation by a customer or end-user, television power-on can present significant issues for operation, continuing support and costs. Typically, televisions in hotels and other guest-serving environments turn ON slowly by charging the system from a stand-by state, where very low power is consumed in order to conserve energy during long periods of inactivity. This power-up from the standby state can take between four and 20 seconds depending on the design of the television. Such a delay results in customer complaints.

SUMMARY OF THE INVENTION

It would be advantageous to achieve power state control in a commercial environment, such as a hotel. It would also be desirable to enable an electrical/programming-based solution that would save power. To better address one or more of these concerns, systems and methods are disclosed for television state power control. In one embodiment, a power management circuit is coupled to a television and interposed between a video feed and an image display engine as well as between an audio feed and a speaker. The power management circuit selectively alternates the television between three states: powered ON/operating state (first state); power standby state (second state); and no/low power state (third state).

In one implementation, the system and method are utilized with a television in a commercial application that can be controlled in a specific manner to provide accelerated turn-on time to receive an image for user interaction, while providing sufficient control to maintain energy power savings. The resulting controlled system meets key requirements for guests of hotels, as well as other venues, such as medical facilities, stadiums, and other commercial television locations, where a television owned by a facility is provided to a customer end user for operation.

In one embodiment, the system combines the interaction of a user and commercial television for the purpose of self directed use. Through the combination of components the television can "Turn-on," meaning provide the user with a TV that is on and has a picture on the screen, within 1-second of the pressing of the "power" or "power ON" button on a remote control or front of TV. In this embodiment, through blanking of video, control of image lighting (back-light, LED, side-light or emissive lighting) and modification of the stand-by indicator state in the television, the desired "Instant On" results can be delivered and controlled for energy savings. Elements inside the television may include a video signal, audio signal, lighting/backlighting, indicator lights and elements of control/interaction may include a user remote control, TV bezel button, external control device or sensors, room entry system, and business/rules logic. These and other aspects of the invention will be apparent from and elucidated with reference to the embodiment(s) described hereinafter.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF THE INVENTION

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention, and do not delimit the scope of the present invention.

Figure 1:
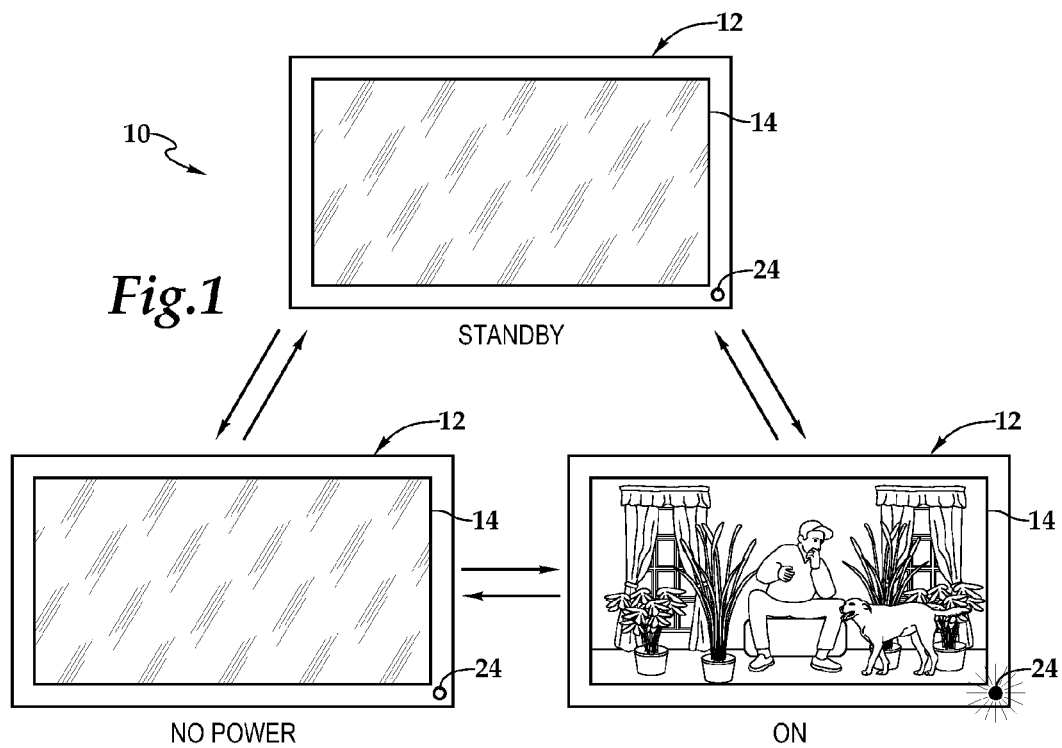
FIG. 1 is schematic diagram depicting one embodiment of the system for television power state control being utilized in conjunction with a television.
Figure 2:
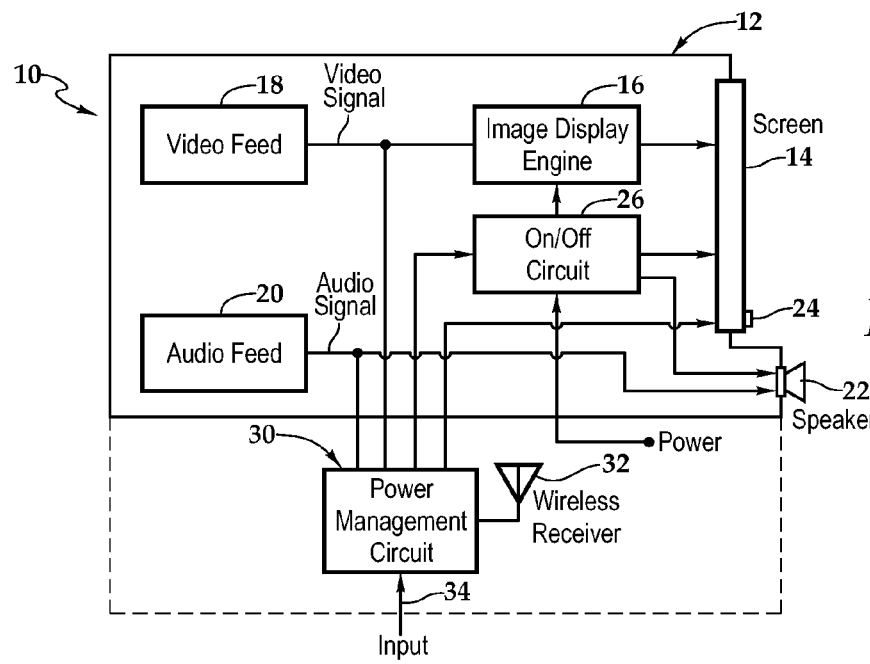
FIG. 2 is a schematic diagram depicting the system in FIG. 1 in further detail.

Referring initially to FIGS. 1 and 2, therein is depicted a system for television power control that is schematically illustrated and generally designated 10. A television 12 is illustrated that includes a display 14 having an image display engine 16 associated therewith. The television also includes a video feed 18 providing a video signal and an audio feed 20 providing an audio signal to speakers 22. A visual indicator 24 associated with the display 14 of the television 12 informs the user of the status of the television. An ON/OFF circuit 26 coupled to a power source powers the television 12. The ON/OFF circuit 26 also provides low power.

A power management circuit 30 is interposed between the video feed 18 and the image display engine 16. Additionally, in one embodiment, the power management circuit 30 is disposed in communication with the visual indicator 24 and interposed between the audio feed 20 and speakers 22 associated with the television 12. As shown, the power management circuit 30 is also disposed in communication with the ON/OFF circuit 26 to control no power/low power settings. As will be discussed in further details hereinbelow, the power management circuit 30 selectively alternates the television 12 between three states: powered ON/operating state (first state); power standby state (second state); and no power/low power state (third state).

At least one receiver is coupled to the power management circuit 30 and configured to receive an activity signal relative to environment activity status. In one implementation of the receiver, a wireless receiver 32 is coupled to the power management circuit 30 in order to receive a wireless activity signal from a monitoring unit, such as an occupancy sensor or remote, located proximate to the television. Moreover, a cabled-input 34 may also form a portion of the power management circuit 30 in order to receive activity signals from a networked source, such as the front desk or backend of a hotel or door lock or light switch, in certain commercial environments.

Figure 3:
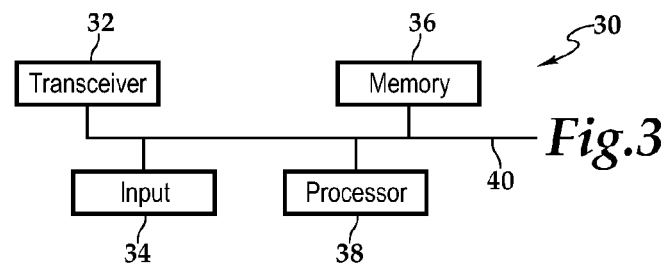
FIG. 3 is a schematic diagram depicting one embodiment of a power management circuit depicted in further detail.

Referring now to FIGS. 2 and 3, the power management circuit 30 may form a portion of the television 12 or, alternatively, form a portion of a set top/back box. In one embodiment, the power management circuit 30 includes the wireless receiver or transceiver 32, input 34, memory 36, and a processor 38, all interconnected by bus 40. In this embodiment, the processor 38 is coupled to the wireless transceiver 32 and the input 34. The processor 38 is also configured to communicate with the video feed 18, the audio feed 20, the image display engine 16, the visual indicator, and the ON/OFF circuit 26.

The memory 36 is accessible to the processor 38 and the memory 36 includes processor-executable instructions that, when executed, cause the processor 38 to selectively alternate between the first state, the second state, and the third state based on received data relative to the environment status e.g., occupancy in the room and desire to watch television. In the first state, the processor 38 drives first signaling to pass the video signal from the video feed 18 to the image display engine 16 and pass the audio signal from the audio feed 20 to a speaker 22. The first signaling also includes driving the visual indicator 24 to display television ON.

In the second state, the processor 38 drives second signaling to the image display engine 16 to blank the video signal, while maintaining synchronization with the image display engine 16. The second signaling also includes blocking the audio signal from the audio feed 20 to the speaker 22 and driving the visual indicator 24 to display television OFF. In the third state, the processor 38 drives third signaling to turn the video feed OFF and to turn the audio feed OFF as well as driving the visual indicator to display television OFF. In one embodiment, in the third state, the processor 38 drives a signal off to the ON/OFF circuit to turn OFF the television 12 or place the television in a low power state. Additionally, in one implementation, when transitioning from the first state to the third state or from the second state to the third state, the processor may decrement a timer or time period. In this implementation, the power state control change is not made until the timer is decremented to zero or a signal is received indicating that the occupant is not returning.

Figure 4:
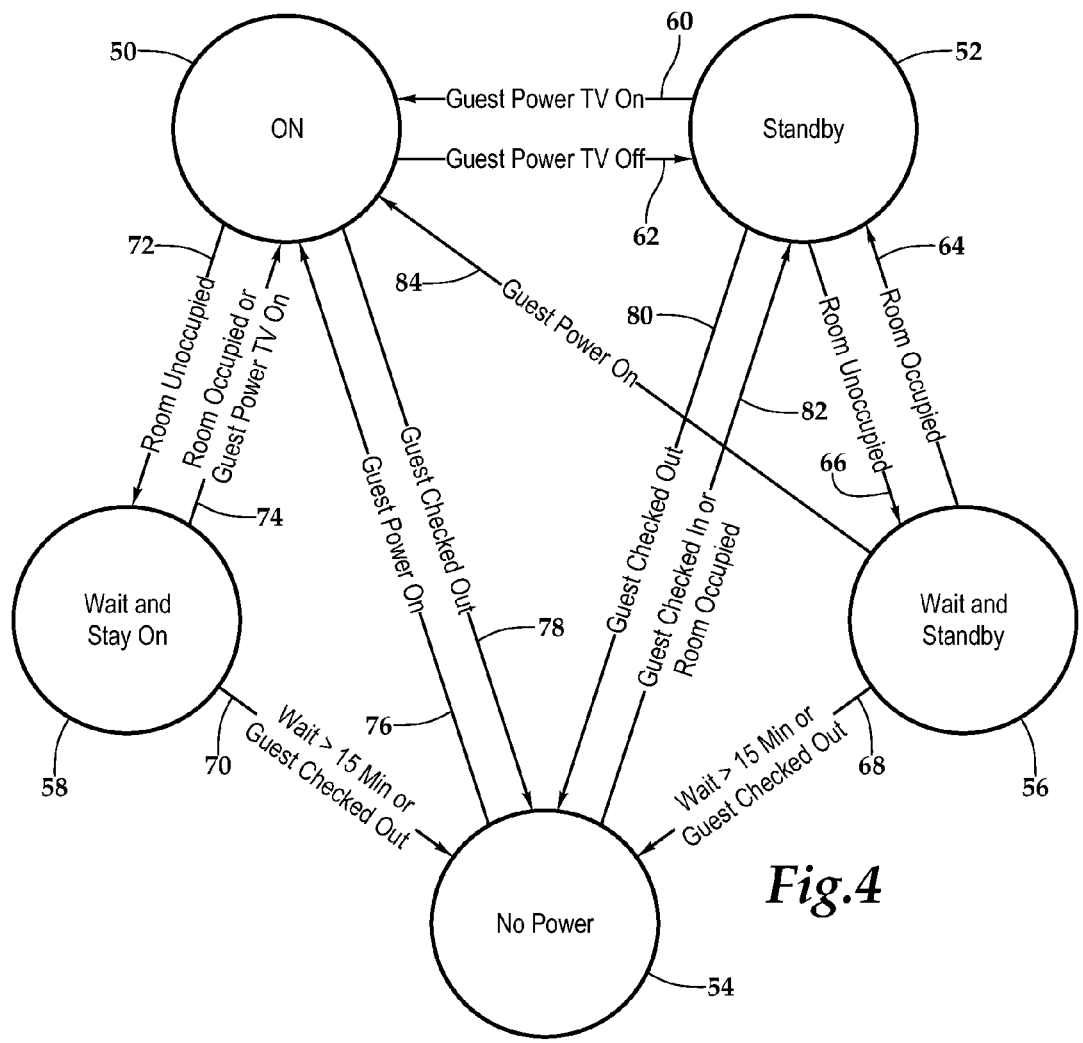
FIG. 4 is a state diagram depicting one embodiment of state transitions and a method for television state power control.

Referring now to FIG. 4, as mentioned, the power management circuit selectively alternates the television between three states: powered ON/operating state (first state 50); power standby state (second state 52); and no power/low power state (third state 54). In the first state 50, the power management circuit passes the video signal to the image display engine and, similarly, the power management circuit passes the audio signal to the speaker. As shown, the first state 50 includes the visual indicator displaying television ON. The second state 52 includes the power management circuit blanking the video signal to the image display engine, while maintaining synchronization with the image display engine. Moreover, the power management circuit blocks the audio signal to the speaker. The second state 52 includes the visual indicator displaying television OFF. The third state 54 includes the power management circuit turning both the video feed and audio feed OFF. Therefore, synchronization between the video feed and the television is lost. The third state 54 also includes the visual indicator displaying television OFF.

The powered ON/operating state (first state 50) is optimally consuming power for an occupied television environment and power ON television. The power standby state (second state 52) is optimized for an occupied television environment and power OFF television, while the no power/low power state (third state 54) is optimized for an unoccupied television environment and power OFF television. In one embodiment, the power management circuit selectively alternates the television between the second state and the third state based on occupancy, between a first state and a second state based on power ON/OFF to the television, and between a first state and a third state based on occupancy and power ON.

Two additional states, which may be considered transitional states, are also shown in FIG. 4. A wait and standby state (fourth state 56) and a wait and stay on state (fifth state 58). The fourth state 56 is respectively located between the second state 52 and third state 54, while the fifth state 58 is positioned between the first state 50 and the third state 54. Environment activity statuses 60-84 are shown as triggers for various power state control transitions.

A guest or other user turning the television ON/OFF by a remote, for example, at statuses 60, 62 may trigger the power control circuit to oscillate between the first state 50 and the second state 52. That is, if the television is ON/operating state (first state 50) and the television is turned OFF, the power control circuit will activate the power standby state (second state 52) and visa versa. If the television is in the power standby state (second state 52) and the television is turned ON, the ON/operating state (first state 50) is activated.

Occupancy may drive the transition from the second state 52 to the third state 54 as shown by environment activity statuses 64-68, which include a transition through the fourth state 56. If the room is unoccupied, as detected by an occupancy sensor or a door key entry/exit and relayed wirelessly or through cabling to the power control circuit, the state transitions from the standby state (second state 52) to the wait and standby state (fourth state 56), where if a time period, such as 15 minutes, lapses or the guest checks out, the state progresses to the no power/low power state (third state 54) as shown by the environment activity status 68. If the room is occupied as detected by some monitor, then the state returns to the standby state (second state 52) as shown by the environment activity status 64. Additionally, if a power ON is detected, then the status returns to the ON/operating state (first state 50) as shown by the environment activity status 84.

Transitions between the standby state (second state 52) and the no power/low power state (third state 54) are also enabled by the guest checking in or checking out as shown by the environment activity statuses 80-82. Through a wireless interface or a network, a message may sent to the power control circuit on the status of the guest, i.e., checking-in or checking-out to change the power status of the television.

With respect to transitions between the power on state (first state 50) and the no power/low power state (third state 54), as shown by environmental activity statuses 76-78, the state may change as a result of the guest checking-in or out. Also, as shown by environmental activity statuses 70-74, the wait and stay on status (fifth state 58) may be transitioned through if the room is detected as unoccupied. If a monitor or other alter informs the power control circuit that the room is no longer occupied, then at wait and stay on status (fifth state 58), if a time period lapses or the guest checks out, then the state is changed to no power state (third state 54).

It should be understood that FIG. 4 is presented with a guest as the occupant in a hotel, however, the teachings presented herein may be used by any occupant in any commercial environment. Moreover, it should be understood that various triggers may activate the system and methods presented herein. By way of example, a non-exhaustive list of triggers and state changes is presented in Table I.

TABLE I

Exemplary Triggers & States

| Trigger | State Triggered |
|---|---|
| Check-in | Second State |
| Check-out | Third State |
| Door Key Entry | Second State |
| Occupant Entry | Second State |
| Occupancy Entry/Exit | Second/Third State |
| Maid/Staff/Maintenance Entry | Second State |
| Room Out-of-Service | Third State |

Figure 5A:
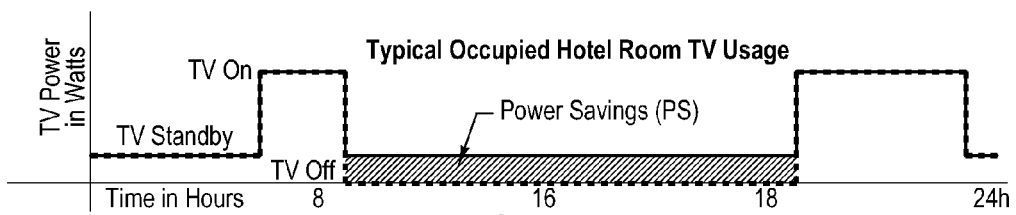
FIG. 5A is a graph of one embodiment of power savings in a typical occupied commercial environment.
Figure 5B:
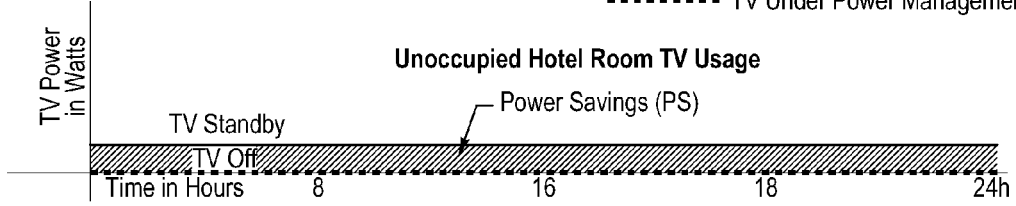
FIG. 5B is a graph of one embodiment of power savings in a typical unoccupied commercial environment, wherein FIGS. 5A and 5B share a common legend.

Referring to FIGS. 5A and 5B, as mentioned, commercial televisions generally require upwards of 20 seconds from the time an end user presses power on a remote or television until a picture is presented for use. The systems and methods presented herein reduce this delay and therefore mitigate resulting guest complaints as while maintaining energy savings. FIG. 5A is a graph of typical occupied hotel room television usage, wherein time in hours is graphed against television power in Watts. As shown, a comparison is presented of normal television power consumption and power consumption under the power management presented herein. The resulting power savings (PS) over a 24 hour period are indicated by the shading. Similarly, FIG. 5B is a graph of unoccupied hotel room television usage wherein the power savings (PS) over a 24 hour period are also shown.

By way of example, when placing a television in a commercial environment for independent operation by a customer or end-user, the system power-on can present significant issues for operation, on-going support and costs. Televisions in hotels and other guest-facing environments that turn on slowly do so by charging the system from a stand-by state where very low power is consumed. This power-up from standby can take between 4 and 20 seconds depending on the design of the television. The design proposed here uses control and business rules for a turn-on time for the user less than one second, while providing a net savings in energy. Using a device connected to the television, the video source is connected and available for view except that the television is controlled to:

Power off lighting element (if any) to reduce power consumption and eliminate light coming from the TV in this state.

"Blank" video which maintains the synchronization and stream of video through the television yet does not show it on the screen.

"Blank" audio which may be coming in from the media source and remains available even without video.

Set user indicators on the television (lights, logos, etc) to represent the OFF or Standby state.

When the user presses the power button, the state of the items above to:

Power on lighting element (if any) to ON state

Activate video which has maintained synchronization and stream on the screen

Activate audio which associated with the media source

Change user indicators on the television (lights, logos, etc) to represent the ON state.

The power savings elements when combined with controlled system provides the three aforementioned states:

Full Power Off (using ZERO Watts of Power)

Low Power Stand-by State

Accelerated Power Sequencing State

In one embodiment, the implementation described above can be achieved in a stand-alone function with a television in a commercial environment, yet the power consumption will be increased and in this state a television cannot achieve EnergyStar or other low power consumption rating. To reduce energy consumption, one embodiment includes a control system to use three states of power to provide Accelerated Power Sequencing, while providing a net energy savings. In this modality, an operation cycle is as follows:

Room Not In Service—When a room is not designated for service or operation, the control device provides a Power-Off command to the integrated power source to place the TV in a Full Power Off state. When a room is designated for use, either centrally controlled or by interaction of the entry or monitoring control (i.e., a motion sensor) systems, the control device can activate the television to Full Power Off, Low Power Standby or Accelerated Power Sequencing states.

Room Unoccupied—When a room is not occupied or in operation, the control device provides a Power-Off command to the integrated power source to place the TV in a Full Power Off state. In this state, the TV is consuming no power. For facilities like hotels, a guest room is unoccupied for a significant period of time per day and this FULL OFF state can provide energy savings.

Accelerated Power Sequencing State—When room is designated for use, or control device receives notification of door entry or motion, the control device can activate the Accelerated Power Sequencing State based upon business rules for the operation and energy efficiency.

Using business rules established by the operator, the Accelerated Power Sequencing State is activated upon door entry notification or motion and a timer is activated. If desired, this state can be set without a timer and the television will remain in this state if the room is determined to be occupied. With the timer, if it reaches the pre-set time, the control device would send a command to the television to change to Low-Power Standby State.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A system for television state power control, the system comprising:

a television including a screen having an image display engine associated therewith, the television including a video feed providing a video signal and an audio feed providing an audio signal, the television including a visual indicator;

a power management circuit interposed between the video feed and the image display engine, the power management circuit in communication with the visual indicator and interposed between the audio feed and speakers associated with the television, the power management circuit configured to selectively alternate the television between a first state, a second state, and a third state;

a receiver coupled to the power management circuit, the receiver configured to receive an activity signal relative to environment activity status;

the first state including the power management circuit passing the video signal to the image display engine and the power management circuit passing the audio signal to the speaker, the first state including the visual indicator displaying television on;

the second state including the power management circuit blanking the video signal to the image display engine such that a blank video image is displayed on the television, the power management circuit maintaining synchronization of the video signal with the image display engine, and the power management circuit blocking the audio signal to the speaker, the second state including the visual indicator displaying television off;

the third state including the power management circuit turning the video feed off, the power management circuit turning the audio feed off, the third state including the visual indicator displaying television off, the second state and the third state having identical visual indicators;

the power management circuit selectively alternates the television between the second state and the third state based on guest occupancy of a commercial lodging environment relative to check-in and check-out of the commercial lodging environment; and the power management circuit selectively alternates the television between the first state and the third state based on the guest occupancy of check-in and power on;

the power management circuit selectively alternates the television between the first state and the second state based on the guest occupancy of check-in and power on/off to the television; and the power management circuit selectively alternates the television between the first state and the second state, between the second state and the third state, and between the first state and the third state.

2. The system as recited in claim 1, further comprising a fourth state including the power management circuit passing the video signal to the image display engine and the power management circuit passing the audio signal to the speaker, the fourth state including the visual indicator displaying television ON, the fourth state including a timer decrementing a time period.

3. The system as recited in claim 1, further comprising the fifth state including the power management circuit blanking the video signal to the image display engine, while maintaining synchronization with the image display engine, and the power management circuit blocking the audio signal to the speaker, the fifth state including the visual indicator displaying television OFF, the fifth state including a timer decrementing a time period.

4. The system as recited in claim 1, wherein the power management circuit forms a portion of the television.

5. The system as recited in claim 1, wherein the power management circuit forms a portion of a set top/back box located in communication with the television.

6. The system as recited in claim 1, wherein the receiver further comprises a wireless receiver coupled to the power management circuit, the wireless receiver configured to receive a wireless activity signal from a monitoring unit located proximate to the television.

7. The system as recited in claim 1, wherein the receiver further comprises an input coupled to the power management circuit, the input configured to receive data relative to environment activity status from a networked source.

8. The system as recited in claim 1, wherein the first state further comprises an optimization for an occupied and power ON television.

9. The system as recited in claim 1, wherein the second state further comprises an optimization for an occupied an power OFF television.

10. The system as recited in claim 1, wherein the third state further comprises an optimization for an unoccupied an power OFF television.

11. A power management circuit for efficient television power state control, the power management circuit comprising:

a wireless transceiver configured to communicate with a proximate wireless-enabled monitor and receive data relative to environment activity status;

an input configured to receive data relative to environment activity status from a networked source;

a processor coupled to the wireless transceiver and the input, the processor configured to communicate with a video feed, an audio feed, an image display engine, and a visual indicator;

a memory accessible to the processor, the memory including processor-executable instructions that, when executed, cause the processor to selectively alternate between a first state, a second state, and a third state based on received data relative to the environment status:

in the first state, drive first signaling to pass the video signal to the image display engine and pass the audio signal to a speaker, the first signaling including the visual indicator displaying television on, in the second state, drive second signaling to blank the video signal to the image display engine such that a blank video image is provided on the signal for display, the power management circuit maintaining synchronization of the video signal with the image display engine, the second signaling including blocking the audio signal to the speaker, the second signaling including the visual indicator displaying television off, the second state and the third state having identical visual indicators, and in the third state, drive third signaling to turn the video feed off and to turn the audio feed off, the third signaling including the visual indicator displaying television off;

the processor selectively alternates the television between the second state and the third state based on guest occupancy of a commercial lodging environment relative to check-in and check-out of the commercial lodging environment; the processor selectively alternates the television between the first state and the third state based on the guest occupancy of check-in and power on;

the power management circuit selectively alternates the television between the first state and the second state based on the guest occupancy of check-in and power on/off to the television; and the power management circuit selectively alternates the television between the first state and the second state, between the second state and the third state, and between the first state and the third state.

12. The power management circuit as recited in claim 11, wherein the processor-executable instructions further comprise, when executed, the processor to decrement a timer period.

13. The power management circuit as recited in claim 12, wherein prior to selectively alternating between the first state and the third state, the processor decrements the time period to zero.

14. A system for television state power control, the system comprising:
- a television including a screen having an image display engine associated therewith, the television including a video feed providing a video signal and an audio feed providing an audio signal, the television including a visual indicator;
- a power management circuit interposed between the video feed and the image display engine, the power management circuit in communication with the visual indicator and interposed between the audio feed and speakers associated with the television, the power management circuit including means for selectively alternating the television between a first state, a second state, and a third state;
- receiving means for receiving an activity signal relative to environment activity status;
- the first state including the power management circuit passing the video signal to the image display engine and the power management circuit passing the audio signal to the speaker, the first state including the visual indicator displaying television on;
- the second state including the power management circuit blanking the video signal to the image display engine such that a blank video image is displayed on the television, the power management circuit maintaining synchronization of the video signal with the image display engine, and the power management circuit blocking the audio signal to the speaker, the second state including the visual indicator displaying television off, the second state and the third state having identical visual indicators;
- the third state including the power management circuit turning the video feed off, the power management circuit turning the audio feed off, the third state including the visual indicator displaying television off;
- the power management circuit selectively alternates the television between the second state and the third state based on guest occupancy of a commercial lodging environment relative to check-in and check-out of the commercial lodging environment;
- the power management circuit selectively alternates the television between the first state and the third state based on the guest occupancy of check-in and power on; and
- the power management circuit selectively alternates the television between the first state and the second state based on the guest occupancy of check-in and power on/off to the television; and
- the power management circuit selectively alternates the television between the first state and the second state, between the second state and the third state, and between the first state and the third state.

15. The system as recited in claim 14, further comprising a fourth state including the power management circuit passing the video signal to the image display engine and the power management circuit passing the audio signal to the speaker, the fourth state including the visual indicator displaying television ON, the fourth state including a timer decrementing a time period.

16. The system as recited in claim 14, further comprising a fifth state including the power management circuit blanking the video signal to the image display engine, while maintaining synchronization with the image display engine, and the power management circuit blocking the audio signal to the speaker, the fifth state including the visual indicator displaying television OFF, the fifth state including a timer decrementing a time period.

17. The system as recited in claim 14, wherein the guest occupancy further relates to a hotel guest.

18. The system as recited in claim 1, wherein the guest occupancy further relates to a hotel guest.

* * * * *